Sept. 6, 1927.
G. L. PRICHARD ET AL
1,641,503
METHOD OF AND APPARATUS FOR CONDENSING ALUMINUM CHLORIDE
Filed Feb. 3, 1923
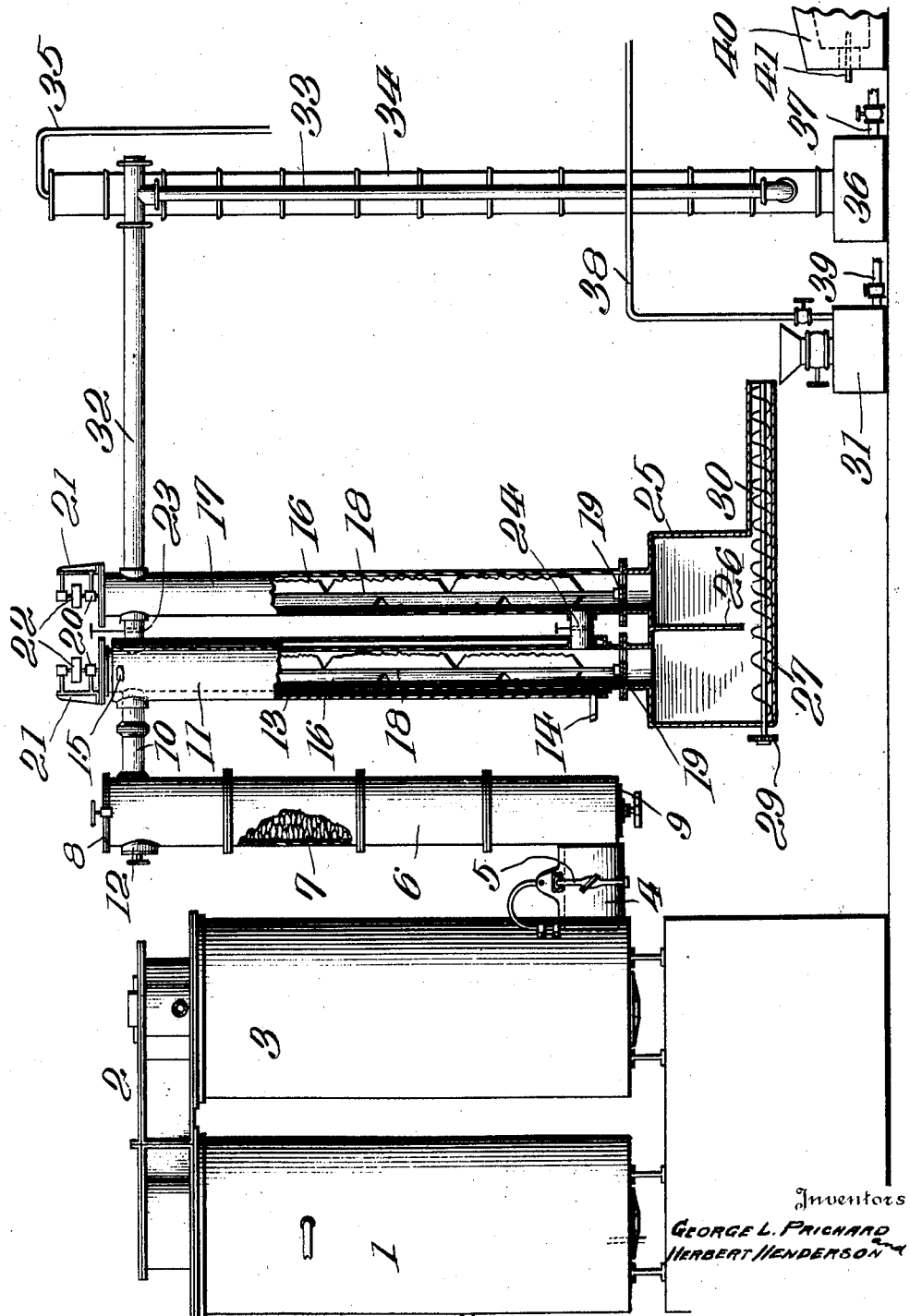
Inventors
GEORGE L. PRICHARD
HERBERT HENDERSON
By K. P. McElroy
their Attorney Patented Sept. 6, 1927.

1,641,503

UNITED STATES PATENT OFFICE.

GEORGE L. PRICHARD AND HERBERT HENDERSON, OF PORT ARTHUR, TEXAS, ASSIGNORS TO GULF REFINING COMPANY, OF PITTSBURGH, PENNSYLVANIA, A CORPORATION OF TEXAS.

METHOD OF AND APPARATUS FOR CONDENSING ALUMINUM CHLORIDE.

Application filed February 3, 1923. Serial No. 616,768.

This invention relates to methods of and apparatus for condensing aluminum chloride and it comprises a method of handling hot vapors containing aluminum chloride wherein such vapors are passed first (advantageously) through a precooling conduit containing particles of metallic aluminum or material taking up $Cl_2$ or HCl, whereby any free chlorin or hydrochloric acid gas in the gases may form aluminum chloride and incidentally thereby protecting the walls of subsequent apparatus which may be steel or the like, and wherein such vapors are then passed through a tubular conduit of much less temperature to produce a fine-grained deposition on the conduit walls, the deposit being removed as soon as formed to prevent the growth of crystals and maintain the wall surface clean and scoured; and it further comprises an aluminum chloride condensing system comprising a source of aluminum chloride vapors, a tubular conduit acting as a precooler and containing aluminous material such as metallic aluminum and the like, a second tubular conduit, advantageously vertically arranged, so operated or constructed as to be of materially less temperature than the vapors passing therethrough, means for keeping its walls clean and scoured free of deposited crystals of aluminum chloride, and receiving means for the aluminum chloride so removed; together with, advantageously, scrubbing means for the waste gases; all as more fully hereinafter set forth and as claimed.

Anhydrous aluminum chloride is a rather volatile, crystalline substance, now made on the large scale and extensively used in various processes of treating oil; being, for example, used in processes of making gasoline from higher boiling oils. It is very sensitive to the action of moisture by which it is decomposed, giving, according to circumstances, hydrated aluminum chloride (which is useless for the purposes of the anhydrous) or alumina and vapors of HCl. In its manufacture and use, therefore, it is necessary to guard it as much as may be from access of air and moisture. It is produced by treating a mixture of alumina, such as bauxite, with carbon by chlorin; by treating aluminum or aluminum dross, aluminum carbid, etc., with chlorin or hydrochloric acid, etc. As so produced, it appears in the form of vapors, these vapors being generally mixed with more or less uncondensable gas, such as carbon oxids, nitrogen, etc. After the use of aluminum chloride as a catalyst in the conversion of oils, when its activity is spent or partially spent, it is contained in various oily, tarry or coky sludges, from which it is recovered by various processes; these processes sometimes involving exposure to heat to sublime out the aluminum chloride. Sometimes recovery is assisted by the introduction of a little chlorin or chlorin-containing gas. The vapors from the recovery apparatus, like those from the retorts etc., in which aluminum chloride is made are hot and mixed with foreign gases and vapors in greater or less proportion.

The present invention relates more particularly to the treatment of these vapors coming either from the manufacture or recovery operation, in order to produce therefrom a granular fine-grained aluminum chloride, readily handled and transported without access of air.

In the usual ways of recovering aluminum chloride from the hot vapors, such vapors are led into a condensing chamber, usually of rather large cross section, as compared with the conduit bringing the vapors and therefore acting as a sort of quieting chamber, a chamber in which the velocity of the passing vapors is slowed down. Sometimes these condensing chambers are of masonry; sometimes of iron or steel. They are usually provided with baffles to cause a circuitous passage of gases and vapors. Whatever the type of chamber, cooling is through the walls and by radiation and on these walls the aluminum chloride deposits, often building up as a hard, dense coating requiring the use of tools to dislodge. Sometimes, this coating is 12 to 18 inches in thickness. As each crystal deposits, it tends to build up, acting as a nucleus for further crystallization and becoming larger. And as the aluminum chloride is not a very good conductor of heat, naturally the escape of heat is better at thin places in the coating or between the growing crystals, with the result that the places fill up, giving the stated hard and compact layer. In removing such a coating with tools, it is of course impossible to prevent some access of air with the result of loss of activity in the chloride and the production of stifling and corrosive vapors of HCl, injurious to the workmen and to iron and steel.

In the present invention, we modify this procedure by passing the vapors as they come from the aluminum chloride making apparatus, advantageously, first through a relatively cool conduit acting as a precooler and containing aluminous material such as metallic aluminum arranged as bars or pigs hung in the conduit or laid on brick shelves or grates preferably near the top so that if a small quantity of free chlorin should leave the aluminum chloride making apparatus on its path to the condensing apparatus it would act on the metallic aluminum to produce aluminum chloride and to prevent the chlorin from deleteriously acting upon the walls of the chamber. This conduit may be cooled by the atmosphere. The vapors then are passed through a relatively long cooled tubular metal conduit which may be cooled by means of water circulating in the surrounding jacket and the vapors are then passed to a second tubular conduit which may be air cooled. Within these conduits we provide abrading and cleansing means, which detach the crystals from the walls as fast as they form, keeping the walls clean and scoured. In so doing, these means also serve to agitate and homogenize the vapors in transit, giving a general, in lieu of a local, cooling. There is a forced or quick cooling with little time afforded for massive crystallization. The building up of the crystals does not go to the extent of forming massive bodies difficult to handle without tools. The net result of operation is the production of a fine-grained, crystal meal, readily handled by conveyers, which therefore it is not necessary to expose to the air at any time. Advantageously, we use a cooler of a general U form, with a depositing chamber at the base of the U, the vapors first going downward through a tubular conduit and then upward through another, the crystals of aluminum chloride formed in both dropping in the receiving chamber at the base. Within this vertical tubular conduit, it is convenient to mount axial shafts carrying chains. Since the condensed aluminum chloride is recovered in a form readily handled it may be sent by the conveyors direct to a mixing chamber, mixed with oil and pumped directly to the place of use without coming in contact with the air.

In the accompanying drawing we have shown an apparatus partly in section and partly in elevation, within the purview of our invention and useful in the performance of our process.

In the drawings, reference numeral 1 indicates a gas producer which may be operated in the usual way. Conduit 2 connects this gas producer to a chamber 3 in which may be located briquets of bauxite and coke or other aluminum chloride producing material. The reaction chamber is provided with the conduit 4 provided with a swinging side door 5 which may be used in case the conduit should clog up. This swinging door 5 may be readily opened and obstructions cleaned out. In communication with the exit 4 of the reaction chamber is a vertical cooling chamber or tower 6 which may be a square steel chamber lined with brick. This tower serves several purposes. First, it acts as a precooler, lowering the temperature of the gases going to the final condensation apparatus and, to that extent, lessening the cooling work required in such apparatus. Second, it is utilized as a dust collector and as a purifying apparatus to remove any free chlorin or hydrochloric acid which may be in the hot gases, the tower being ordinarily provided with a charge of material readily reactive with either gas. By freeing the vapors of corrosive gases in the precooler, the use of chain agitators in the subsequent apparatus is made much more feasible. Generally, in order to economize labor and handling, we use as the purifying material bar or pig aluminum, as indicated at 7, placed in the upper part of the tower. However, we may use a variety of other reactive materials, such as aluminum carbid, aluminum nitrid, aluminum sulfid, aluminum dross, furnaced materials containing reduced aluminous material, etc. Any $Cl_2$ or HCl in the hot mixture of gases or vapors leaving the reaction chamber is converted into aluminum chloride and cannot gain access to the steelwork of the subsequent condensing apparatus. The purifying and precooling functions of the tower are applicable whatever the source of the hot vapors carrying aluminum chloride. For example, in recovery of aluminum chloride from spent residues by various processes, hot impure vapor-gas mixtures are produced which often carry either $Cl_2$ or HCl, or both; and these vapors are often too hot to make it desirable to send them directly to condensing apparatus. This cooling chamber (7) is provided with a door 8 at the top and dust door 9 at the bottom so that in case it should clog up or any notable quantities of solid aluminum chloride should form in it in the event of undue cooling here occurring, it can easily be cleaned out. This arrangement also provides easy access for the purpose of replacing the metallic aluminum when it is partially or completely consumed. Ordinarily there is but little condensation of aluminum chloride in this cooling chamber, its cooling effect serving mainly to reduce the temperature of the vapors leaving the retort and facilitate subsequent condensation in the final condensers. In the precooler the vapors are brought to a temperature just above that at which any substantial deposition of solid aluminum chloride will take place.

The vapors from the preliminary cooling chamber described pass through the conduit 10 to the top of the first condenser tower 11. Directly opposite the conduit 10 is a door 12 in the cooler 6 so that should the conduit 10 become plugged a tool may be inserted in the door 12 to remove condensed aluminum chloride. In actual operation, there has been little necessity for the use of this door under proper working conditions.

The first condenser 11 is provided with a steel jacket 13 having water inlet 14 at the bottom and outlet 15 at the top. Water is circulated in this jacket to cool the condenser 11. Interiorly the condenser is provided with scouring chains 16. And since the second condenser 17 is similar in construction (with the exception that it is not provided with the water cooled jacket) the same reference numerals will be used to describe the scouring means. These condensers are arvantageously cylindrical sheet metal tubes and they are provided with a shaft 18 journaled at their bottom in the spider arms 19 and passing through stuffing boxes 20 at the top. The shafts are journaled in brackets 21 and are each provided with a pulley 22 rotated from a source of power, not shown. The condensers 11 and 17 are in communication at the top through the valved line 23 and at the bottom through the valved line 24. The shaft in each condenser is provided with a chain or chains 16 looped in such a way that they may thoroughly contact with the inner walls of the condensers as they are thrown out by centrifugal action. The two condensers are in communication with the box 25 having the baffle plate 26 and provided at its lower end with a screw conveyor 27 driven by shaft 28 a pulley 29 from a source of power not shown. The conveyor last described delivers material by the extension 30 to a mixing device 31 to be hereinafter described. Gases and uncondensed products from the condensers 11 and 17 pass by line 32 and branch 33 to the bottom of the scrubbing tower 34, water being admitted in the form of a spray at the top of said tower by the line 35. Scrubbed out material and the solutions formed collect in the tank 36 from which they may be withdrawn continuously or from time to time by valved line 37.

The aluminum chloride removed from the collection chamber 25 by means of the screw conveyor 27 in the extension 30 may be delivered continuously or from time to time through receptacle 31 which comprises a mixing tank. Hot oil, advantageously of the character of that to be used in an oil treating process such as an aluminum chloride distillation process, and advantageously warmed or heated to a temperature of from 150° to 400° F., is admitted to this mixing tank 31 by hot oil line 38 and the dissolved or melted magma of aluminum chloride and hot oil thus formed is delivered continuously or from time to time to the steel or other apparatus (not shown) by valved line 39. The oil delivered by hot oil line 38 may be heated in coils in furnace 40 provided with an oil burner 41; the details of this furnace not being shown. The oil is pumped to the furnace 40, heated in the coils therein, and delivered by line 38 to the tank or kettle 31.

The aluminum chloride condensed in condensers 11 and 17 is removed from the walls thereof as fast as it condenses so that it reaches the conveyor 27 in a relatively fine form, permitting easy removal and being in a form readily mixable with the hot oil delivered to kettle 31.

The vapors of aluminum chloride leaving the retort 3 may be sent in parallel down through the condensers 11 and 17 or may be sent down condenser 11 and then up condenser 17 by proper manipulation of the valves in the lines 23 and 24. The wall of the condensing chambers 11 and 17 are kept clean thus allowing greater condensing effect and, as stated, the aluminum chloride is removed continuously in a fine crystal form. Aluminum chloride may be delivered to the place of use without coming in contact with the air, this being possible because of the removal of the aluminum chloride from the condensers in the way described and in a form in which it is readily mixed with hot oil.

This case is a continuation of our copending application Serial No. 536,502, filed February 14, 1922. In this prior case we did not describe and claim the preliminary cooling chamber here identified by reference numeral 6 and we did not describe and claim the water cooling jacket of the first condenser (although stating that it could be cooled by air or otherwise). Either air cooling or water cooling may be used for the condensation chamber, this depending somewhat upon the correlations between daily capacity, average air temperatures, height, diameter, etc., in other words between the amount of heat to be disposed of and the radiating capacity; but in actual work we have generally found it better to supplement air cooling by at least some water jacket cooling.

What we claim is:—

1. The process of condensing aluminum chloride rapidly which comprises conducting a gaseous mixture containing aluminum chloride vapors to and through a tubular heat radiating chamber while scouring the interior walls of said chamber to prevent accumulation of solid chloride thereon and to produce formation of such chloride in fine form and removing the produced fine aluminum chloride from the condenser.

2. The process of condensing aluminum chloride rapidly which comprises conducting a hot gaseous mixture containing aluminum chloride vapors to and through a precooler containing material adapted to remove corrosive gases, cooling the mixture therein to a temperature just above that at which substantial condensation of aluminum chloride will take place, passing the precooled mixture to and through a tubular condenser having heat radiating walls and removing condensed aluminum chloride from the walls of said tubular condenser as fast as produced whereby said walls are kept clean and scoured.

3. The combination with apparatus producing condensible vapors of aluminum chloride, of a condenser comprising a plurality of upright tubular members of heat-conducting material provided with internal flexible scouring means arranged to scour the internal walls thereof and connected for free passage of vapors both at points near their lower ends and at points near their upper end, whereby vapors may be passed through said members alternatively in series and in parallel.

4. The combination with aluminum chloride vapor producing apparatus, of a preliminary cooling chamber for vapors emerging therefrom and a condenser receiving precooled vapors from the last named element, said condenser comprising a substantially vertical tubular member of heat-conducting material and means in the condenser for preventing accumulation of condensed aluminum chloride on the walls thereof.

5. The combination with aluminum chloride vapor producing apparatus of a preliminary cooling chamber receiving hot vapors therefrom and containing aluminous material, and of a condenser receiving vapors from the preliminary cooling chamber and comprising a substantially vertical tubular member of heat-conducting material and means in the condenser for preventing accumulation of condensed aluminum chloride on the walls thereof.

6. The combination with aluminum chloride vapor producing apparatus of a preliminary cooling chamber containing metallic aluminum, and a condenser comprising a substantially vertical tubular member of heat-conducting material, and means in the condenser for preventing accumulation of condensed aluminum chloride on the walls thereof.

In testimony whereof we have hereunto set our names at Port Arthur, Texas, this 30th day of January, 1923.

GEORGE L. PRICHARD.
HERBERT HENDERSON.